United States Patent [19]

Niino et al.

[11] 4,106,748
[45] Aug. 15, 1978

[54] VALVE WITH TWO VALVE PLATES

[75] Inventors: Yasukazu Niino, Kitakyushu; Takuya Nagai, Nogata, both of Japan

[73] Assignee: Nishinippon Engineering Co., Ltd., Fukuoka, Japan

[21] Appl. No.: 727,499

[22] Filed: Sep. 28, 1976

[30] Foreign Application Priority Data

Aug. 25, 1976 [JP] Japan .......................... 51-114218[U]
Aug. 25, 1976 [JP] Japan .......................... 51-114219[U]

[51] Int. Cl.² ............................................. F16K 31/02
[52] U.S. Cl. ...................... 251/133; 251/56; 251/163; 251/188
[58] Field of Search ............... 251/130, 133, 161, 162, 251/163, 188

[56] References Cited

U.S. PATENT DOCUMENTS

| 1,639,743 | 8/1927 | Marscheider | 251/163 X |
| 2,879,798 | 3/1959 | Anderson | 251/163 X |
| 2,917,069 | 12/1959 | Lundy | 251/133 X |
| 3,180,362 | 4/1965 | Muller | 251/163 X |
| 3,854,696 | 12/1974 | Keyes | 251/163 |

FOREIGN PATENT DOCUMENTS

| 1,281,224 | 12/1961 | France | 251/163 |
| 351,024 | 9/1972 | U.S.S.R. | 251/161 |

*Primary Examiner*—Harold Weakley
*Attorney, Agent, or Firm*—Frank J. Jordan

[57] ABSTRACT

A valve with a pair of valve plates includes a valve-plate actuating mechanism operably connected between the valve plates and a valve shaft for transforming the movement of the valve shaft to the movement of the valve plates such that the latter are pivotably movable about the axis of the valve shaft and displaceable along an axis perpendicular to the axis of the valve shaft.

12 Claims, 9 Drawing Figures

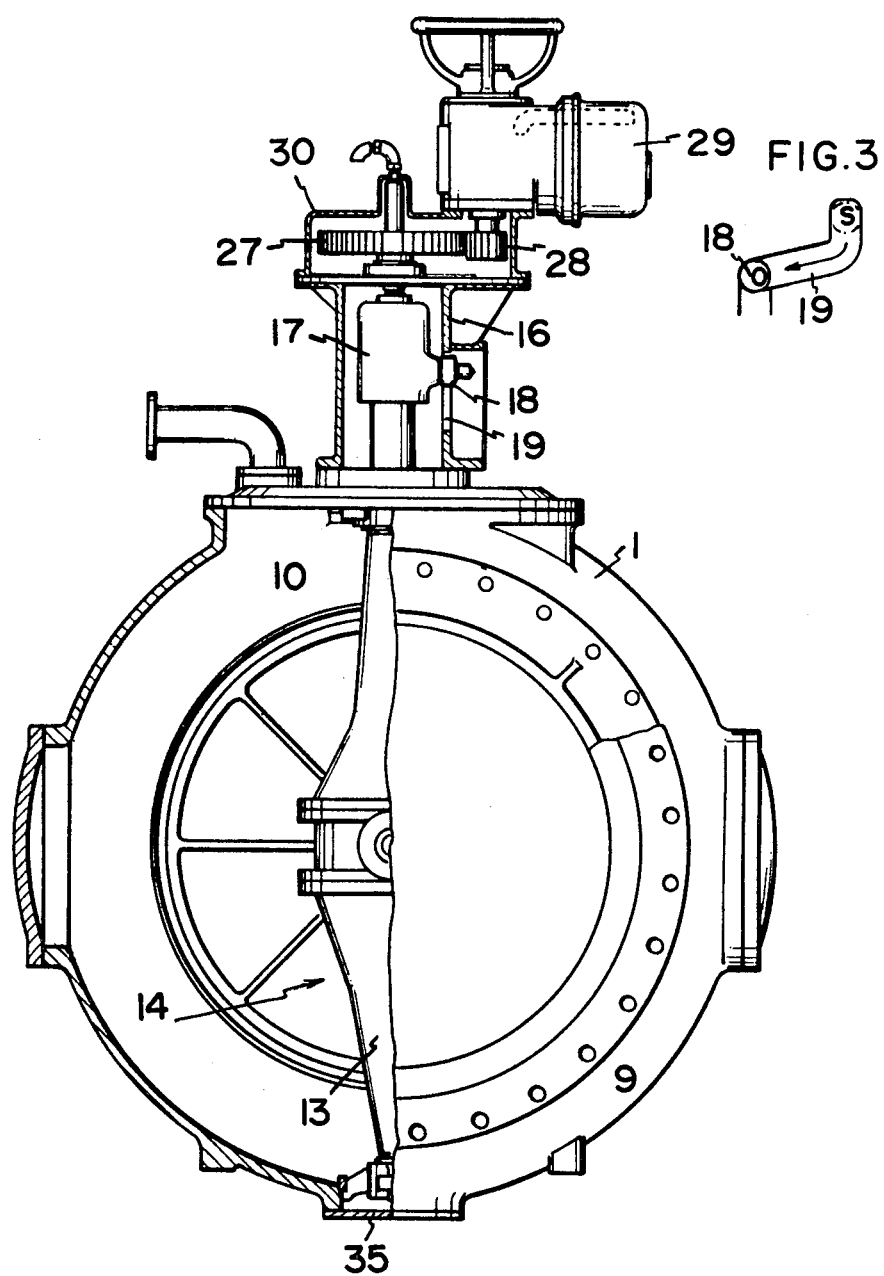
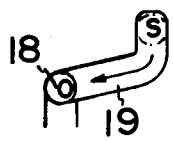

VALVE WITH TWO VALVE PLATES

BACKGROUND OF THE INVENTION

This invention relates to a power-operated valve with a pair of rotary valve plates which opens or closes by disposing a pair of spherically-shaped valve plates tightly onto the valve seats of the valve casing.

With respect to large-sized power-operated valves which are used in power plants or chemical plants for regulating a gaseous or fluid body and which virtually necessitate the remote control thereof, conventional valves cannot be regulated with promptness and tight sealing. In general, conventional power-operated valves are driven by either a pneumatic operating means or an electrically-operating means. In these conventional electrically-operated valves, the rotation and urging of the valve plates against the valve seats are conducted by one motor for effecting rotation and another motor for urging the valve plates against the valve seals so that the valve has a considerably intricate or complicated construction.

In conventional pneumatically-operated valves, there is also the disadvantage that since the pneumatic cylinder mechanism moves upwardly or downwardly and rotates relative to the valve casing, the air supply hoses attached to the side of the cylinder are repeatedly slackened and tightened so that the hoses are worn or broken and cause leakage of working air.

Furthermore, due to the above construction, the valve requires a considerable total valve height resulting in an inconvenience and disadvantage in the mounting of the valve.

In addition, the valve-plate actuating mechanism which is disposed within the valve has the disadvantage that the movement of the valve shaft is not smoothly interlocked with the movement of the valve plates so that seizure or damage of the valve-plate actuating mechanism occurs.

Accordingly, it is an object of the present invention to provide a power-operated valve which will overcome the aforementioned disadvantages of conventional valves.

It is another object of the present invention to provide a power-operated valve which overcomes the mentioned disadvantages of conventional valves wherein the valve is characterized by a single power-operated motor which is capable of both rotating the valve plates and urging the valve plates against the valve seats of the valve whereby the valve has a simple construction.

It is still another object of the present invention to provide, according to one embodiment of the present invention, a pneumatically-operated valve which overcomes the aforementioned disadvantages of conventional valves and which is characterized in that a power cylinder is mounted on the valve casing so that the air piping can be attached in a stationary position, thereby obviating the problems related with air piping, and the total valve height can be minimized facilitating the easy installation of the valve in any place and furthermore, a specially devised valve-plate actuating mechanism enables the smooth interlocking relationship between the movement of the valve shaft and the valve plates.

The above and other objects and features of the invention will appear more fully hereinafter from a consideration of the following description taken in connection with the accompanying drawings wherein two embodiments are illustrated.

SUMMARY OF THE INVENTION

A valve with a pair of valve plates comprises a valve casing having two communicating ports, a pair of valve plates disposed in the valve casing for closing the communicating ports, a valve shaft mounted on the valve casing, a valve-shaft actuating mechanism mounted on the valve casing for operating the valve shaft, and a valve-plate actuating mechanism operably connected between the valve shaft and the valve plates for transforming the movement of the valve shaft to the movement of the valve plates such that the latter are pivotably movable about the axis of the valve shaft and displaceable along an axis perpendicular to the axis of the valve shaft.

BRIEF DESCRIPTION OF THE DRAWINGS

FIG. 2 is a side view of the valve in FIG. 1 with a part broken away and in sections.

FIG. 3 is an enlarged front view of the inclined and elongated guide slot used on the valve in FIGS. 1 and 2.

DESCRIPTION OF THE PREFERRED EMBODIMENTS

The power-operated valve of this invention is described in detail by way of two embodiments in conjunction with the accompanying drawings.

First Embodiment

This embodiment relates to an electrically-operated valve, especially to a large-sized valve which has a simple construction but yet is capable of opening and closing with certainty.

Figure 1:
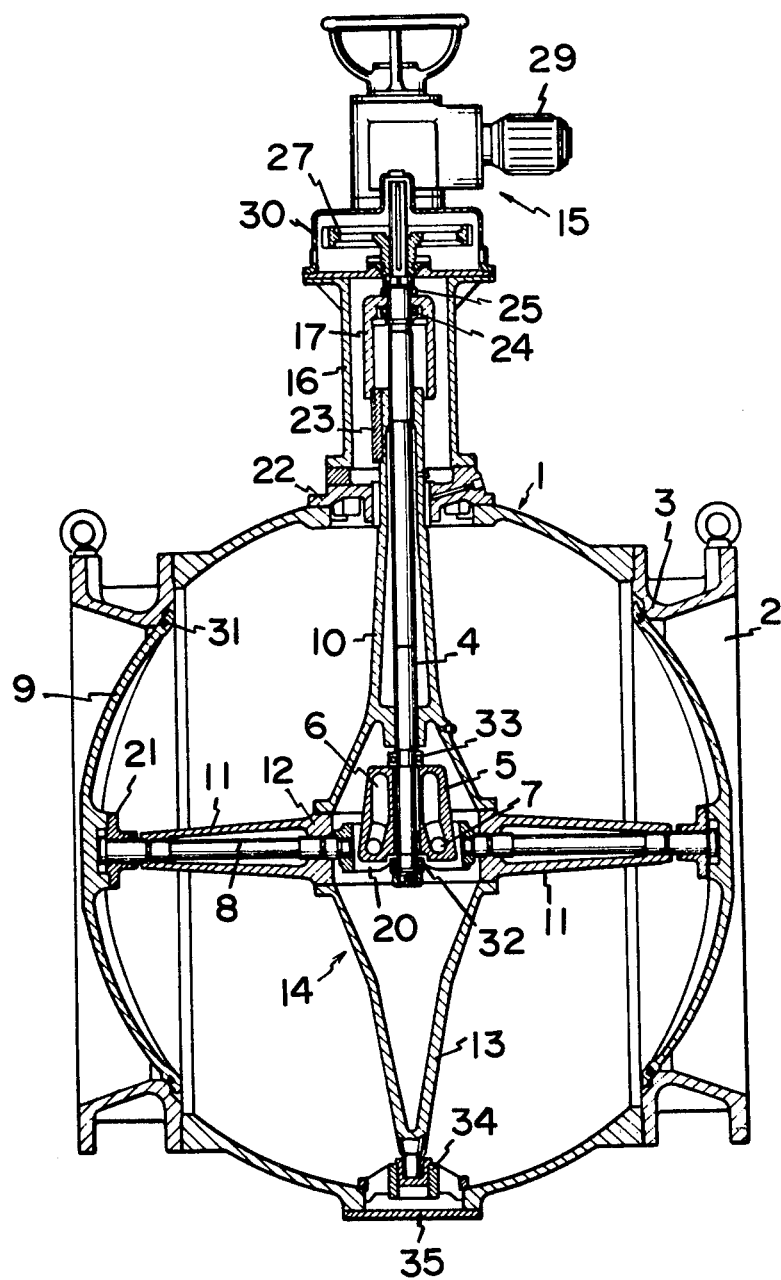
FIG. 1 is a cross-sectional front view of an electrically-operated valve according to one embodiment of the present invention.

Referring to the drawings, and particularly to FIGS. 1 to 3, ring-shaped valve seats 3,3 are formed on the innerside peripheries of communicating ports 2,2 of a valve casing 1. A vertical valve shaft 4 is disposed on the central longitudinal axis of the valve casing 1 and a shifter 5 is mounted on the lower end of the valve shaft 4. A pair of J-shaped longitudinal slots 6,6 are formed on the shifter 5 generally parallel to the central longitudinal axis, and slide pins 7,7 are slidably disposed within the above slots.

The shifter 5 is connected to one end of valve-plate reciprocating rods 8,8 by means of the longitudinal slots 6,6 and the slide pins 7,7, and the other end of the reciprocating rods 8,8 are fixedly secured to the centers of the backs of spherically-shaped valve plates 9,9 which have their respective spherical surfaces urged into contact with the valve seats 3,3 of the valve casing 1.

The shifter 5 is enclosed in a shifter casing 14 which consists of an upper frame structure 10 which rotatably supports the valve shaft 4, an intermediate hollow body 12 which is provided with a pair of oppositely-directed reciprocating-rod support bodies 11,11 on the outer surface thereof, and a lower frame structure 13. The bottom end of the lower frame structure 13 is pivotally mounted on the bottom of the casing 1. The top portion of the upper frame structure 10 is threaded and meshes with a threaded portion of the rotating shaft 4. Furthermore a power-operating mechanism 15 which slidably rotates the valve shaft 4 is disposed at an upper position above the valve casing 1, and the power-operating mechanism 15 and the valve casing 1 are connected by way of a frame structure 16 for guiding the rotation of the valve plates 9,9. A rotating sleeve 17 which has an upper portion thereof rotatably mounted on the rotating shaft 4 and which has a lower inner peripheral portion non-rotatably but slidably mounted on the outer periphery of the upper frame structure 10 is disposed within the frame structure 16. A roller means 18 (FIG. 3) for guiding the rotating sleeve 17 is fixedly secured to the rotating sleeve 17. Still furthermore, there is on the frame structure an inclined and elongated guide slot 19 within and along which the above roller means 18 rolls on so as to turn the rotating sleeve 17 by 90°.

Numeral 20,20 indicate shackles which connect the slide pins 7,7 and valve-plate reciprocating rods 8,8. Numeral 21,21 indicate adaptors which mount the above reciprocating rods to the backs of spherically-shaped valve plates 9,9. Numeral 22 indicates an upper lid means which rotatably supports the upper frame structure 10 on the upper portion of the valve casing 1, numeral 23 indicates a slide key which prevents rotation of the upper frame structure 10 relative to the rotating sleeve 17, and numerals 24 and 25 indicate spring means which permit slight longitudinal movement or the rotating sleeve 17 along and relative to the rotating shaft 4.

The power-operating mechanism 15 which causes the rotation and elevation of the rotating shaft 4 comprises a gear wheel 27 which is non-rotatably but slidably mounted on the top portion of the valve shaft 4, a pinion gear 28 which meshes with the gear wheel 27 and a valve regulation power-operated motor 29 which has fixedly secured to the output shaft thereof the pinion gear 28. Numeral 30 indicates a protecting cover for the gear mechanism.

Numeral 31 indicates seal rings which are embedded in the spherically-shaped valve plates 9,9 for the purpose of enhancing the tightness of the valve when the valve plates 9,9 are urged and pressed against the valve seats 3 of the valve casing 1.

Numerals 32 and 33 indicate spring means which permit slight longitudinal movement of the shifter 5 relative to the rotating axis 4. Numeral 34 indicates a bearing means which pivotally supports the bottom end of the shifter casing 14 on the bottom of the valve casing 1, and numeral 35 indicates a dust cover which is replaceably attached to the bottom of valve casing 1 for facilitating cleaning of the inside of the valve casing.

The manner in which the power-operated valve of this embodiment is operated will now be described. When the electrically-operated valve is required to be turned from a closed position shown in FIG. 1 to a full-open position, the power-operated motor 29 is first operated. The driving force of the motor 29 is transmitted to the rotating shaft 4 by way of the pinion gear 28 and the gear wheel 27 and causes rotation of the rotating shaft 4.

Since the rotating valve shaft 4 has a portion thereof threaded onto the upper frame structure 10, the rotation of the shaft 4, needless to say, causes lowering of the shaft 4. Due to the simultaneous rotation and lowering of the valve shaft 4, slide pins 7,7 slide along and within the J-shaped longitudinal slots 6,6 and pull in the reciprocating rods 8,8 toward the central longitudinal axis of the valve whereby contact between the spherically-shaped valve-shaped valve plates 9,9 and the valve seats 3,3 is broken.

Meanwhile the above simultaneous rotation and lowering of the valve shaft 4 causes the guide roller means 18 which is fixedly secured to the rotating sleeve 17 to move downwardly along and within the inclined and elongated guide slot 19 from a position "S" to a position "O". The above movement of the roller means 18 in turn causes a 90° rotation of the rotating sleeve 17 and eventually causes the succeeding rotation of the shifter casing 14 which encloses the valve-plate reciprocating mechanism and spherically-shaped valve plates 9,9, whereby the valve plates 9,9 are displaced to a full-open position where the fluid body smoothly passes through the valve.

When the electrically-operated valve is required to be activated from the above full-open position to the full-closed position, the power-operated motor 29 is driven in a direction opposite to the valve-opening direction.

Due to the activation of the motor 29, the rotating valve shaft 4, in this case, is raised while rotating. The above simultaneous rotation and raising of the valve shaft 4 causes the upward movement of the roller means 18 from the position "O" to the position "S" within and along the slot 19 so that the rotating sleeve 17, shifter casing 14, and spherically-shaped valve plates 9,9 are rotated in a direction opposite to the valve-opening direction by the movement of the roller means 18.

Meanwhile the simultaneous rotation and raising of the valve shaft 4 causes the slide movement of the slide pins 7,7 within and along the J-shaped slots 6,6 so that the reciprocating rods 8,8 extend toward the communicating ports 2,2 and the spherically-shaped valve plates 9,9 are urged and pressed against the peripheral valve seats 3,3 of the valve whereby the power-operated motor is completely closed.

As has been described heretofore, the power-operated valve of this invention has the following advantages:

(1) Since the valve is operated by a power-operated motor, the space which is required to enclose the valve-plate actuating mechanism can be minimized.

(2) When the valve is to be remotely controlled, the valve of this embodiment facilitates the easy making of the electric circuit sequence and also facilitates the easy interlocking movement with other (related) facilities and furthermore, it minimizes the occurrence of electrically related troubles.

(3) Conventional power-operated valves require two power-operated motors for rotating the valve plates and for urging and pressing the valve plates against the valve seats respectively whereas the valve of this embodiment requires only one power-operated motor for the above two operations due to the specific construction disclosed heretofore, whereby the valves can be produced with a minimum cost.

(4) Due to the valve plate reciprocating mechanism which substantially comprises the shifter and slide pins, the valve can effect the opening and closing thereof with great precision.

Second Embodiment

This embodiment relates to a pneumatically-operated valve which is characterized in that the cylinder means which effects the rotation and linear movement of two valve plates is integrally mounted on the valve casing.

Figure 4:
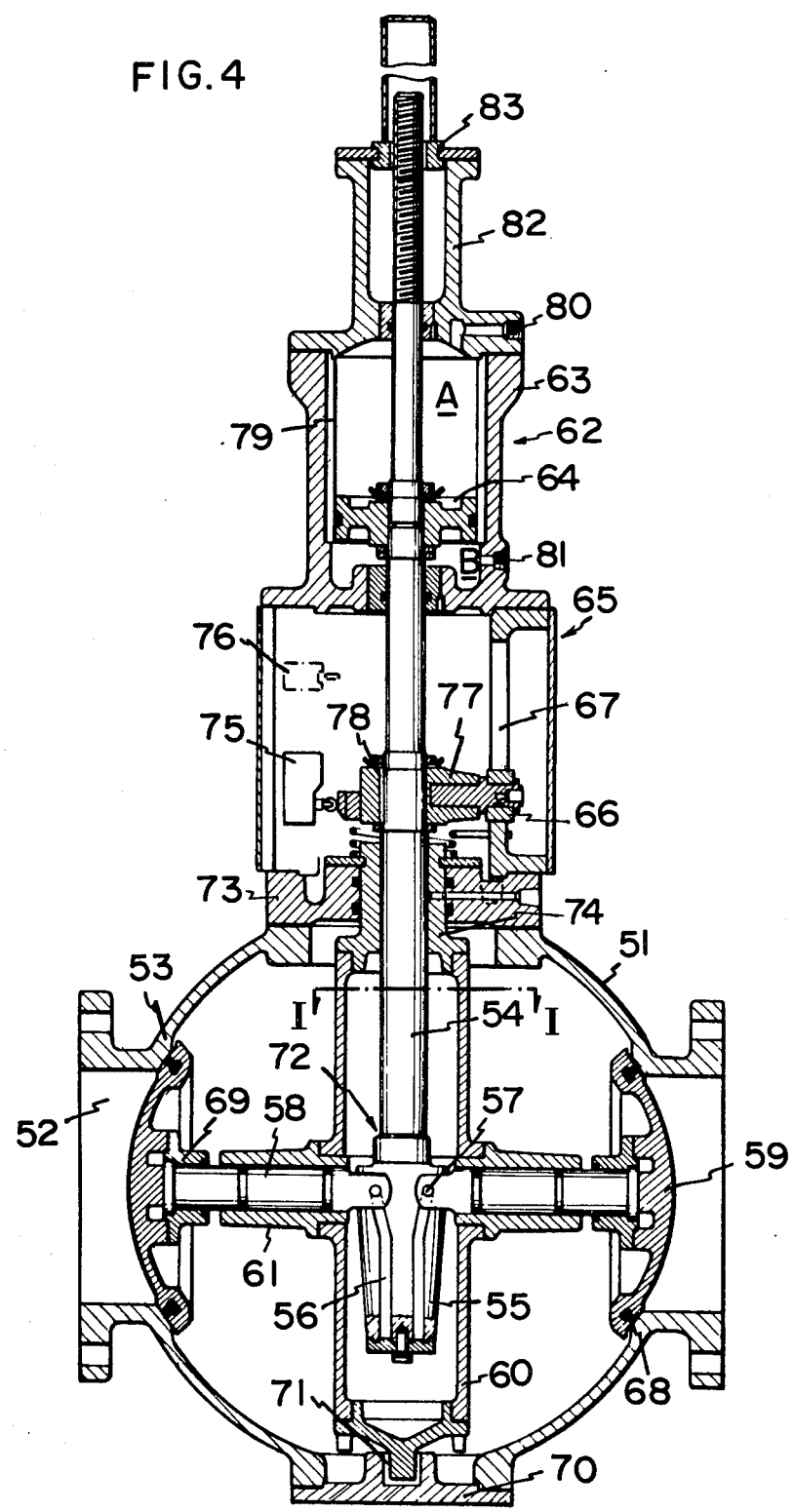
FIG. 4 is a cross-sectional front view of a pneumatically-operated valve according to a second embodiment of the invention.
Figure 5:
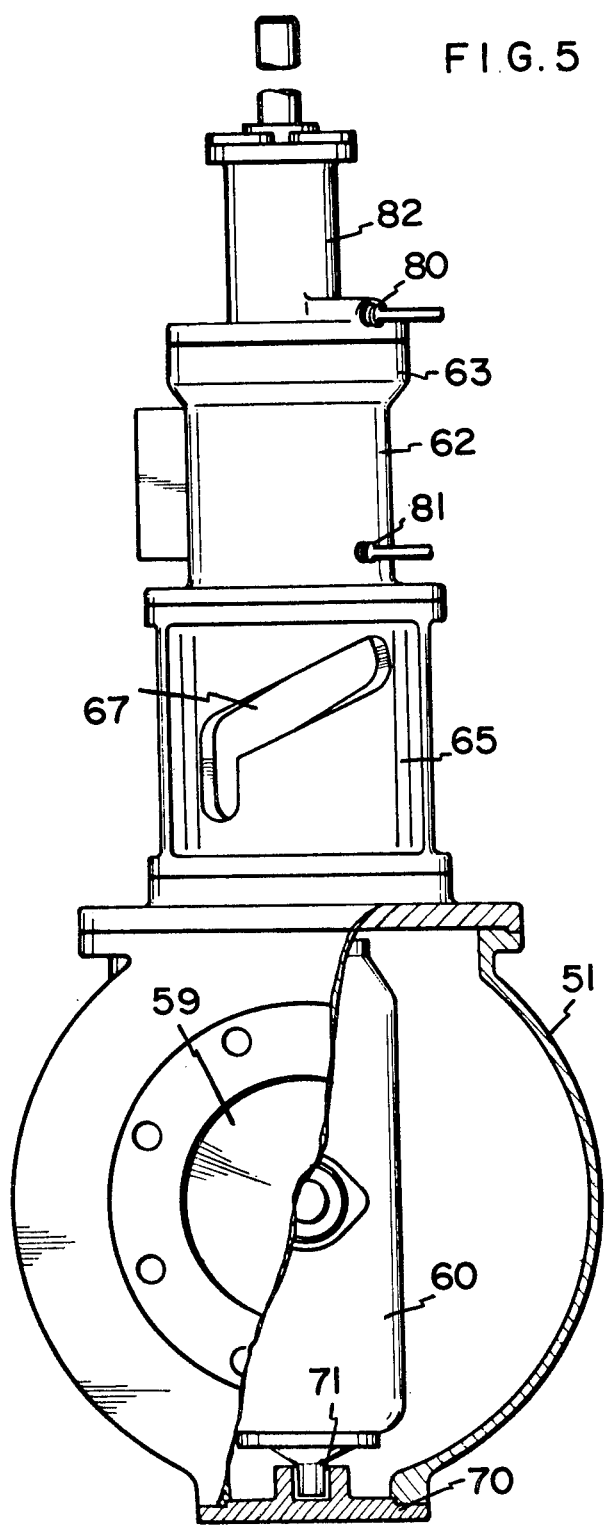
FIG. 5 is a side view of the valve in FIG. 4 with a part broken away and in sections.
Figure 6:
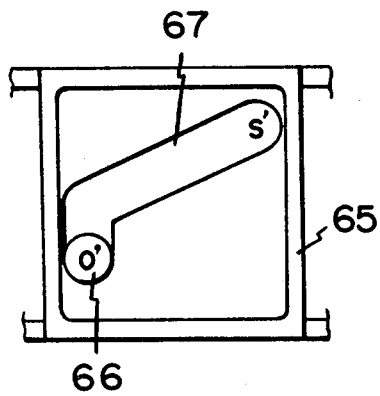
FIG. 6 is an enlarged front view of the inclined and elongated guide slot used in the valve of FIGS. 4 and 5.
Figure 7:
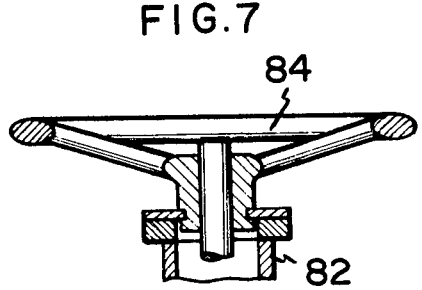
FIG. 7 is a partial sectional view showing the mounting of the manually-operated handle.
Figure 8:
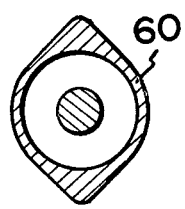
FIG. 8 is a cross-sectional view taken on line I—I in FIG. 4.

Referring to the drawings, and particularly to FIGS. 4 to 6, ring-shaped valve seats 53,53 are formed on the inner-side peripheries of communicating ports 52,52 of a valve casing 51. A vertical valve shaft 54 is disposed on the central longitudinal axis of the valve casing 51 and a shifter 55 is mounted on the bottom end of the valve shaft 54. A pair of inverse J-shaped longitudinal slots 56,56 are formed on the shifter 55 and slide pins 57,57 are slidably disposed within the above slots 56,56. The shifter 55 is connected with one end of valve-plate reciprocating rods 58,58 by means of the above longitudinal slots 56,56 and slide pins 57,57, and the other end of the reciprocating rods 58,58 are fixedly secured to the centers of the backs of spherically-shaped valve plates 59,59 which have their respective spherical surfaces urged into contact with the valve seats 53,53 of the valve casing 51. The shifter 55 is elevatably disposed within a shifter casing 60, and the valve-plate reciprocating rods 58,58 are slidably disposed within reciprocating-rod support bodies 61,61 which have their respective proximal ends fixedly secured to the middle portion of the shifter casing 60.

A cylinder mechanism 62 which is provided for elevating the valve shaft 54 is disposed at an upper position above the valve casing 51. The cylinder mechanism 62 comprises a piston 64 disposed within a cylinder body 63. The piston 64 has a central base of which the inner periphery is rotatably mounted on the valve shaft 54. However, the piston 64 is mounted on the valve shaft 54 for simultaneous axial movement of the piston 64 and valve shaft 54. The outer periphery of the piston 64 is slidably but non-rotatably disposed within the cylinder body 63. The cylinder mechanism 62 and the valve casing 51 are connected by a frame structure 65 for guiding the rotation of the valve plates. An inclined and elongated guide slot 67 within and along which a roller means 66 fixedly secured to the rotating valve shaft 54 moves and rotates by 90° corresponding to the elevation of the valve shaft 54 is formed on the outer periphery of frame structure 65.

Numeral 68 indicates a seal ring which is embedded in the outer periphery of the spherically-shaped valve plates 59,59 for enhancing the tightness of the valve when the valve plates 59,59 are urgingly pressed against the valve seats 53,53 of the valve casing 51. Numeral 69 is a valve plate fastening means which fixedly secures the valve plate 59 to the reciprocating rod 58. Numeral 70 indicates a lower cover bearing which is replaceably attached to the bottom of the valve casing 51 for facilitating the cleaning of the inside of the valve and the replacing of the parts within the valve with new parts. This lower cover bearing 70 is further provided with a recess 71 in which the lower end of the shifter casing 60 is rotatably supported.

Numeral 72 indicates a connecting mechanism which connects the valve shaft 54 and the shifter 55 such that the elevation and rotation of the valve shaft 54 are transmitted to the shifter 55 smoothly and with certainty.

Figure 9:
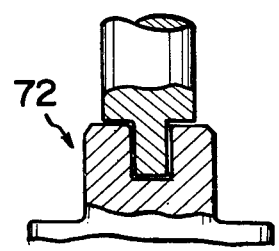
FIG. 9 is an enlarged side view partly broken away and in sections of the connecting arrangement which connects the valve shaft and the shifter.

FIG. 9 clearly shows the above connecting mechanism wherein the reduced plate-like end of the valve shaft 54 is disposed within a slot formed in the shifter 55. Numeral 73 indicates an upper lid means which rotatably supports an upper support structure 74 which in turn is fixedly secured to the top portion of the shifter casing 60. Numerals 75,76 indicate limit switches which are employed for defining the slide length and rotational angle (90°) of the rotating valve shaft 54. Numerals 77 and 78 indicate a guide body and a slide key respectively, and they are provided for fixedly securing the roller means 66 to the valve shaft 54. Numeral 79 indicates a slide key which prevents the rotation of the piston 64 relative to the cylinder body 63. Numerals 80 and 81 indicate air inlets for actuating the cylinder mechanism 62 wherein the air inlet 80 supplies the compressed air for closing the valve while air inlet 81 supplies the compressed air for opening the valve.

Numerals 82 through 84 indicate a mechanism for manually operating the valve of this invention if necessary wherein numeral 82 indicates a stand, numeral 83 indicates a replaceable bearing and numeral 84 indicates a manually-operated handle which is fixedly mounted on the stand 82 and which has an inner periphery meshing with the top portion of the valve shaft 54.

The manner in which the pneumatically-operated valve of this embodiment is operated will now be described. When the above valve is required to be shifted from a closed position in FIG. 4 to an open position, compressed air is first charged into the lower cylinder compartment B so that the piston 64 and the valve shaft 54 are raised upwardly.

The above upward movement of the valve shaft 54 causes the slide pins 57,57 to slide along within the inverse J-shaped longitudinal slots 56,56 so that the reciprocating rods 58,58 and spherically-shaped valve plates 59,59 are integrally pulled back toward the central longitudinal axis of the valve, whereby the contact relationship between the valve seats 53,53 and valve plates 59,59 is severed.

Due to the further upward movement of the valve shaft 54, the roller means 66 which is secured to the valve shaft 54 rotates along and within the inclined and elongated guide slot 67 from a point O' to a point S'.

When the roller means 66 reaches the point S', the valve shaft 54 stops its upward and rotating movement due to the activation of the limit switch 76 wherein the valve shaft 54 has rotated on its axis 90°. Along with the above rotation of the valve shaft 54, the shifter 55, valve plate reciprocating rods 58,58, the shifter casing 60, and the spherically-shaped valve plates 59,59 are also rotated by 90° whereby the valve becomes completely open. In the above operation since the piston 64 is rotatably mounted on the valve shaft 54, the cylinder mechanism does not rotate with the valve shaft 54.

When the pneumatically-operated valve is required to be shifted from the open position to the closed position in FIG. 4, compressed air is charged into the upper cylinder compartment A so that the piston 64 and the valve shaft 54 are lowered together. Due to the above lowering or downward movement of the valve shaft 54, the roller means 66 rolls along and within the inclined and elongated guide slot 67 from the position S' resulting in the rotation of the valve shaft 54. Further lowering of the valve shaft 54 to the point O' after the shifter 55 is rotated by 90° causes the simultaneous lowering of the shifter 55 which eventually extends the valve-plate reciprocating rods 58 to urgingly engage the spherically-shpaed valve plates 59,59 against the valve seat 53,53 with tightness, whereby the valve is completely closed.

The pneumatically-operated valve described above has the following advantages.

(1) In a conventional pneumatically-operated valve, the air piping moves upwardly or downwardly and rotates relative to the valve casing during the activation of the cylinder so that the air supply piping eventually results in air leakage due to the damage caused by the repetition of slackening and tightening. In this invention since the cylinder is fixed to the valve casing, the air piping can by stationarily installed whereby the trouble of air leakage can be prevented.

(2) Since the actuating cylinder and the valve casing are integrally constructed, the total or overall height of the valve can be considerably reduced whereby the valve can be installed even in a location where conventional valves cannot be installed.

(3) Since the shifter and the valve shaft are connected by a specially-devised arrangement, the rotation and the elevation of the valve shaft can be transmitted to the shifter smoothly and with certainty.

(4) Since the lower cover bearing which rotatably supports the shifter casing is replaceably attached to the bottom of the valve casing, the cleaning of the inside of the valve or the replacement of the parts within the valve can be conducted easily and promptly.

(5) Since the shifter casing has a stream-line shaped cross section, the fluid body to be regulated such as gas smoothly flows through the valve when the valve is fully opened.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A valve with a pair of valve plates comprising a valve casing having two communicating ports, a pair of valve plates disposed in said valve casing for closing said communicating ports, a valve shaft mounted on said valve casing, a valve-shaft actuating mechanism mounted on said valve casing for operating said valve shaft, and a valve-plate acutating mechanism operably connected between said valve shaft and said valve plates for transforming the movement of said valve shaft to the movement of said valve plates such that the latter are pivotably movable about the axis of said valve shaft and displaceable along an axis perpendicular to the axis of said valve shaft, said valve-plate actuating mechanism comprising a shifter casing, said shifter casing having a first portion disposed generally coaxial with the axis of said valve shaft and a second portion disposed generally perpendicular to the axis of said valve shaft, and operable means disposed within said shifter casing operably connecting said valve shaft and said valve plates, said valve shaft actuating mechanism comprising a sleeve rotatably disposed about said valve shaft, said first portion of said shifter casing being disposed about said valve shaft, said sleeve engaging said upper portion of said shifter casing to preclude relative rotation therebetween while permitting relative axial displacement therebetween.

2. A valve according to claim 1 wherein said valve-shaft actuating mechanism comprises a frame structure on said valve casing, said frame structure being disposed about said valve shaft, said valve-shaft actuating mechanism also comprising a power-operated motor means mounted on said frame structure.

3. A valve according to claim 2 wherein said valve-shaft actuating mechanism comprises means defining a slot in said frame structure, and engageable means operable connected to said valve shaft and having roller means engageable in said slot such that said roller means is displaced along said slot as the valve is operated.

4. A valve according to claim 3 wherein said roller means is mounted on said sleeve, said roller means comprising a roller mounted on an axis perpedicular to the axis of said sleeve.

5. A valve according to claim 2 wherein said power-operated means comprises an electric motor, and gear means disposed between said electric motor and said valve shaft for rotating the latter to effect opening and closing of said valve plates.

6. A valve according to claim 1 wherein said valve casing has a bottom section, said first portion of said shifter casing being rotatably mounted on said bottom section of said valve casing.

7. A valve according to claim 1 wherein said communicating ports are located on opposite sides of said valve casing, said valve casing having valve seats about said communicating ports.

8. A valve according to claim 7 wherein said valve plates have spherical sealing surfaces means, said valve seats having spherically-shaped surfaces engaged by said spherical sealing surfaces means of said valve plates.

9. A valve according to claim 7 wherein said spherical surface means comprises a sealing ring mounted on said valve plates.

10. A valve according to claim 1 wherein said valve casing has a bottom section, and a cover lid replaceably mounted on said bottom section of said valve casing.

11. A valve with a pair of valve plates comprising a valve casing having two communicating ports, a pair of valve plates disposed in said valve casing for closing said communicating ports, a valve shaft mounted on said valve casing, a valve-shaft actuating mechanism mounted on said valve casing for operating said valve shaft, and a valve-plate actuating mechanism operably connected between said valve shaft and said valve plates for transforming the movement of said valve shaft to the movement of said valve plates such that the latter are pivotably movable about the axis of said valve shaft and displaceable along an axis perpendicular to the axis of said valve shaft, said valve-plate actuating mechanism comprising a shifter casing, said shifter casing having a first portion disposed generally coaxial with the axis of said valve shaft and a second portion disposed generally perpendicular to the axis of said valve shaft, and operable means disposed within said shifter casing operably connecting said valve shaft and said valve plates, said operable means comprising lateral shafts slidably mounted within said second portion of said shifter casing, said lateral shafts having said valve plates mounted thereon, and shifter means operably connected between said lateral shafts and said valve shaft for effecting axial displacement of said lateral shafts and valve plates upon axial displacement of said valve shaft, said shifter means comprising a shifter element mounted on said valve shaft, said shifter element have means defining slots, said lateral shafts having lateral pins disposed within said slots such that axial displacement of said valve shaft effects a corresponding axial displacement of said lateral shafts.

12. A valve according to claim 11 wherein said slots are generally J-shaped.

* * * * *